US009575655B2

(12) United States Patent
Rytivaara (10) Patent No.: US 9,575,655 B2
(45) Date of Patent: Feb. 21, 2017

(54) TRANSPARENT LAYER APPLICATION

(75) Inventor: Markku Rytivaara, Oulu (FI)

(73) Assignee: Nokia Technologies Oy, Espoo (FI)

( * ) Notice: Subject to any disclaimer, the term of this patent is extended or adjusted under 35 U.S.C. 154(b) by 796 days.

(21) Appl. No.: 11/618,000

(22) Filed: Dec. 29, 2006

(65) Prior Publication Data

US 2008/0163082 A1 Jul. 3, 2008

(51) Int. Cl.
*G06F 3/048* (2013.01)
*G06F 3/0488* (2013.01)
*G06F 1/16* (2006.01)
*G06F 3/0481* (2013.01)

(52) U.S. Cl.
CPC ........ *G06F 3/04886* (2013.01); *G06F 1/1626* (2013.01); *G06F 3/0481* (2013.01); *G06F 2203/04804* (2013.01)

(58) Field of Classification Search
CPC .... G06F 3/0481; G06F 3/4443; G06F 3/0482; G06F 2203/04804; G06F 3/0483; G06F 3/0213; G06F 3/0202; G06F 3/0488; G06F 3/04883; G09G 5/14
USPC ........ 345/168, 173; 715/700, 764, 768, 777, 715/781, 790
See application file for complete search history.

(56) References Cited

U.S. PATENT DOCUMENTS

| | | | |
|---|---|---|---|
| 5,335,323 A | 8/1994 | Kolnick | |
| 5,812,132 A * | 9/1998 | Goldstein | G06Q 10/109 715/797 |
| 6,232,957 B1 * | 5/2001 | Hinckley | 345/156 |
| 6,246,407 B1 * | 6/2001 | Wilks et al. | 715/803 |
| 6,333,753 B1 * | 12/2001 | Hinckley | 715/768 |
| 6,353,450 B1 * | 3/2002 | DeLeeuw | G06F 3/0481 345/623 |
| 6,384,840 B1 | 5/2002 | Frank et al. | |
| 6,404,443 B1 * | 6/2002 | Westerman | 715/776 |
| 6,694,486 B2 | 2/2004 | Frank et al. | |
| 7,096,432 B2 * | 8/2006 | Huapaya et al. | 715/863 |
| 7,124,373 B1 * | 10/2006 | Patil | 715/779 |
| 7,167,165 B2 | 1/2007 | Keely et al. | |
| 7,181,698 B2 * | 2/2007 | Shahrbabaki et al. | 715/790 |
| 7,429,993 B2 * | 9/2008 | Hui | 345/629 |
| 7,783,983 B1 * | 8/2010 | Mayers et al. | 715/764 |
| RE41,922 E * | 11/2010 | Gough et al. | 715/803 |
| 7,831,922 B2 | 11/2010 | Huapaya et al. | |
| 7,956,845 B2 * | 6/2011 | Lee | 345/173 |

(Continued)

FOREIGN PATENT DOCUMENTS

CN 1458564 A 11/2003
EP 0 344 082 A 11/1989
(Continued)

OTHER PUBLICATIONS

International Search Report and Written Opinion, PCT/IB2007/004119, Mailed Aug. 18, 2008.
(Continued)

*Primary Examiner* — Rashawn Tillery
(74) *Attorney, Agent, or Firm* — Alston & Bird LLP (57) ABSTRACT

An apparatus comprising a processor and a display connected to the processor, the display being configured to present a first and second application on the display so that the second application is transparently presented over the first application wherein the first and second applications are active applications.

20 Claims, 9 Drawing Sheets

(56) References Cited

U.S. PATENT DOCUMENTS

| | | | |
|---|---|---|---|
| 8,166,417 B2* | 4/2012 | Iijima | 715/802 |
| 8,239,784 B2* | 8/2012 | Hotelling et al. | 715/830 |
| 8,495,514 B1* | 7/2013 | Ludolph | G06F 3/0481 |
| | | | 715/768 |
| 8,856,680 B2* | 10/2014 | Jung | G06F 9/4443 |
| | | | 715/718 |
| 2002/0002060 A1 | 1/2002 | Singh et al. | |
| 2003/0001899 A1* | 1/2003 | Partanen et al. | 345/800 |
| 2003/0071850 A1* | 4/2003 | Geidl | 345/781 |
| 2003/0214540 A1 | 11/2003 | Huapaya et al. | |
| 2004/0113948 A1* | 6/2004 | Shahrbabaki et al. | 345/777 |
| 2005/0010875 A1* | 1/2005 | Darty et al. | 715/768 |
| 2006/0059432 A1* | 3/2006 | Bells | G06F 3/0481 |
| | | | 715/768 |
| 2006/0061597 A1 | 3/2006 | Hui | |
| 2006/0218500 A1* | 9/2006 | Sauve et al. | 715/767 |
| 2007/0083820 A1* | 4/2007 | Blythe et al. | 715/781 |
| 2007/0083911 A1* | 4/2007 | Madden et al. | 725/135 |
| 2007/0139430 A1* | 6/2007 | Korn et al. | 345/581 |
| 2007/0186176 A1* | 8/2007 | Godley | 715/764 |
| 2007/0226636 A1* | 9/2007 | Carpenter et al. | 715/751 |
| 2007/0250787 A1* | 10/2007 | Kawahara et al. | 715/782 |
| 2008/0046837 A1* | 2/2008 | Beauchamp et al. | 715/804 |
| 2008/0077872 A1* | 3/2008 | Zeevi | G06F 3/0481 |
| | | | 715/762 |
| 2008/0215999 A1* | 9/2008 | Kim | H04B 1/406 |
| | | | 715/762 |

FOREIGN PATENT DOCUMENTS

| | | |
|---|---|---|
| EP | 0344082 | 11/1989 |
| EP | 0 605 945 A | 7/1994 |

OTHER PUBLICATIONS

Dell Inc., "Dell (TM) Axim (TM) X51/X51v Owner's Manual", Mar. 2006.

Canadian Office Action dated Jul. 12, 2010.

Chinese Office Action dated Nov. 12, 2010.

Korean Office Action dated Feb. 10, 2011.

Office Action for CN Appl. No. 200780050442.5, dated Aug. 10, 2011.

Office Action for Chinese Application No. 200780050442.5 dated Dec. 7, 2012.

Office Action for Korean Application No. 10-2009-7015910 dated Oct. 24, 2011.

Office Action for Chinese Application No. 200780050442.5 dated Dec. 7, 2011.

Office Action for EP Application No. 07-866-590.8 dated Mar. 29, 2011.

Office Action for Chinese Application No. 200780050442.5 dated Nov. 28, 2014.

Examination Report from corresponding Indian Office Action Application No. 3735/CHENP/2009 dated Nov. 15, 2016.

* cited by examiner

FIG. 8

TRANSPARENT LAYER APPLICATION

BACKGROUND

1. Field

The disclosed embodiments relate to user interfaces and, more particularly, to user interfaces for electronic devices.

2. Brief Description of Related Developments

Currently electronic devices such as personal computers, personal digital assistants, mobile phones and the like can run applications simultaneously, but a user of the device must switch between the application when the user wants to use one the running applications. For example, if a calendar application is running in the foreground of an electronic device (i.e. the active application) and a music player is running in the background the user must deactivate the calendar application or otherwise make the calendar application inactive or move the application to the background rather than the foreground before the user can access and operate the music player and vice versa.

It would be advantageous to be able to simultaneously operate more than one application without continuously switching from one application to another.

SUMMARY

In one embodiment, an apparatus is provided. The apparatus includes a processor and a display connected to the processor, the display being configured to present a first and second application on the display so that the second application is transparently presented over the first application wherein the first and second applications are active applications.

In another embodiment, a method is provided. The method includes displaying a first application on a display and displaying a second application on the display so that the second application is transparently presented over the first application wherein the first and second applications are actively running for operation by a user.

In another embodiment, a computer program product is provided. The computer program product includes a computer useable medium having computer readable code means embodied therein for causing a computer to display at least a first and second application. The computer readable code means in the computer program product includes computer readable program code means for causing a computer to displaying a first application on a display and computer readable program code means for causing a computer to display a second application on the display so that the second application is transparently presented over the first application wherein the first and second applications are actively running for operation by a user.

BRIEF DESCRIPTION OF THE DRAWINGS

The foregoing aspects and other features of the disclosed embodiments are explained in the following description, taken in connection with the accompanying drawings, wherein.

DETAILED DESCRIPTION OF THE EXEMPLARY EMBODIMENT(S)

Figure 1:
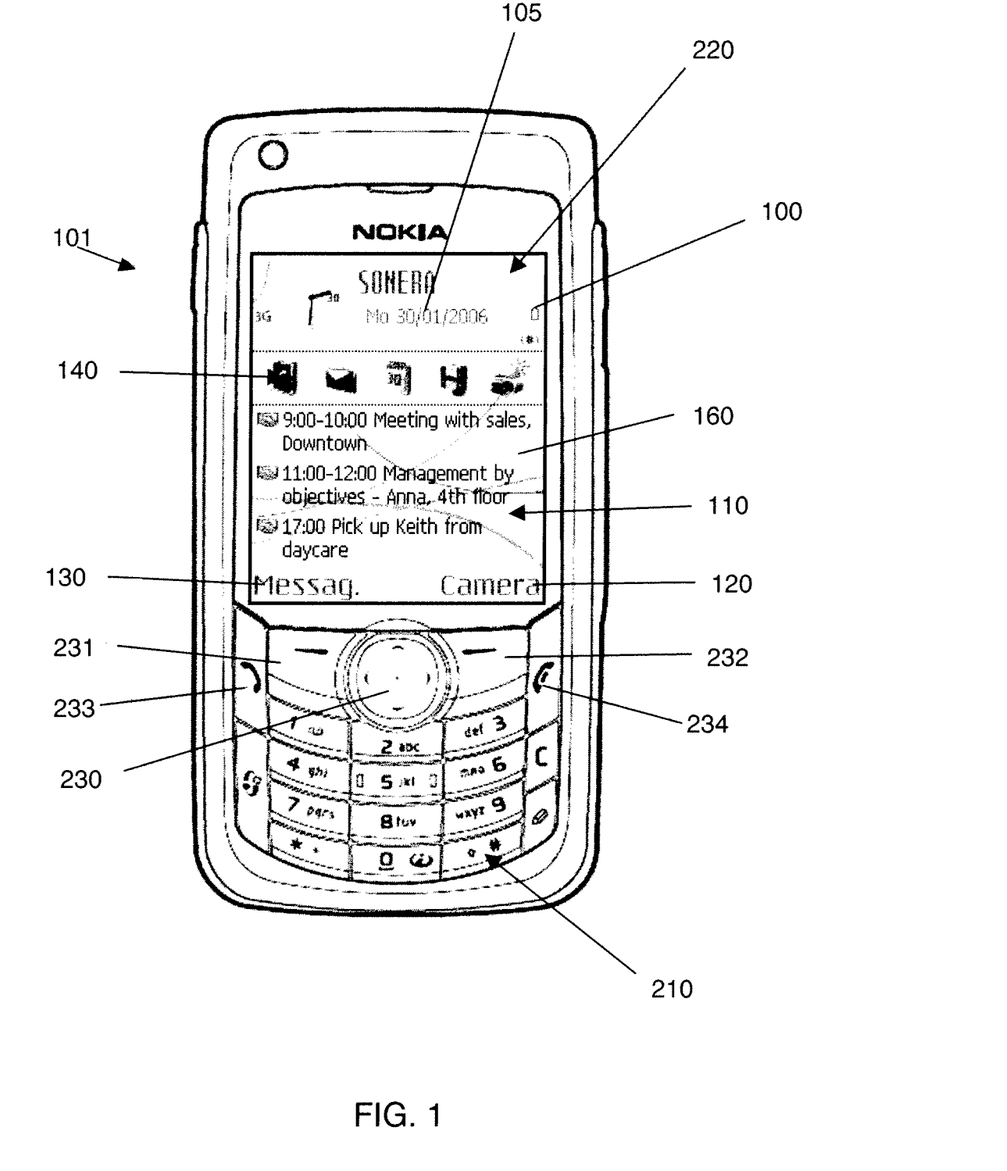
FIG. 1 illustrates a device in which aspects of the disclosed embodiments may be implemented.

FIG. 1 illustrates a device 101 in which aspects of the disclosed embodiments may be employed. Although the embodiments disclosed will be described with reference to the embodiments shown in the drawings, it should be understood that the embodiments disclosed can be embodied in many alternate forms of embodiments. In addition, any suitable size, shape or type of elements or materials could be used.

The exemplary embodiments herein will be described with reference to the mobile communications device 101 shown in FIG. 1 for exemplary purposes only and it should be understood that the embodiments could be applied equally to any suitable device incorporating, for example, a display, processor, memory and supporting software or hardware for implementing the disclosed embodiments. Referring to FIG. 1, the display 220 of the device 101 may include an application section 110, soft key functions 120, 130, an application bar 140, a battery indicator 100, the date 105 and any other suitable information or items. The application bar 140 may allow a user to select an application stored in the device. For example, as can be seen in FIG. 1A, the application bar 160 may include a phone book, email or other messaging application, a calendar, video player, printing function and any other suitable applications. The user may use the scroll or navigation key 230 to scroll through and select an application from the application bar 140. In alternate embodiments the applications may be scrolled through and selected in any suitable manner such as, for example, via a menu of the device or with a stylus interacting with a touch screen display. In this example the calendar function is selected for presentation on the display 220. The user's calendar entries may be presented in the application section for viewing or modification by the user.

The user of the device 101 may have a first application running on the device. The first application that is running on the device is referred to herein as the native application. In this example, the application section 110, soft key functions 120, 130, application bar 140, application section 110, battery indicator 100, the date 105 will collectively be referred to herein as the native application 160 (e.g. the native application is the display screen that is presented on the display before the user activates a transparent application functionality of the device as will be described in greater detail below). In alternate embodiments, the native application may be any suitable portion of the display screen including any suitable application that is running on the device. In accordance with the disclosed embodiments, the user may want to open another application (e.g. secondary applications) without closing, deactivating or otherwise moving the calendar application to the background rather than have the calendar application in the foreground. The secondary applications may be any suitable applications of the device. To allow the user to open more than one application so that the user can operate the more than one application at the same time, the device may be configured to open the secondary applications so that the secondary applications are layered over the native application and over each other in a transparent manner. Because the secondary applications are displayed in a transparent manner, the secondary application will be referred to herein as transparent applications.

The native application may be presented on the display 220 of the device 101 as it would be displayed if it were the only application open on the device. A first transparent application may be presented on the display so that it is layered over the native application. The first transparent application may be transparently displayed so that the user can see both the native application and the first transparent application. A second transparent application may be layered on top of both the native application and the first transparent application so that the user can view all three applications at the same time and so on. All of the applications (i.e. native and transparent applications) presented on the display are active applications (e.g. the user can operate the applications without switching between them). To allow the user to operate each of the native and transparent applications, a portion of the device 101 user interface may be assigned to each of the applications. For exemplary purposes only, the keypad 210 may be configured to operate the native application, the scroll key 230 may be configured to operate the first transparent application and the soft keys 231, 232, the send key 233 and end call key 234 may be configured to operate the second transparent application. In alternate embodiments the device 101 may be suitably configured to operate each of the native and secondary applications.

Figure 2A:
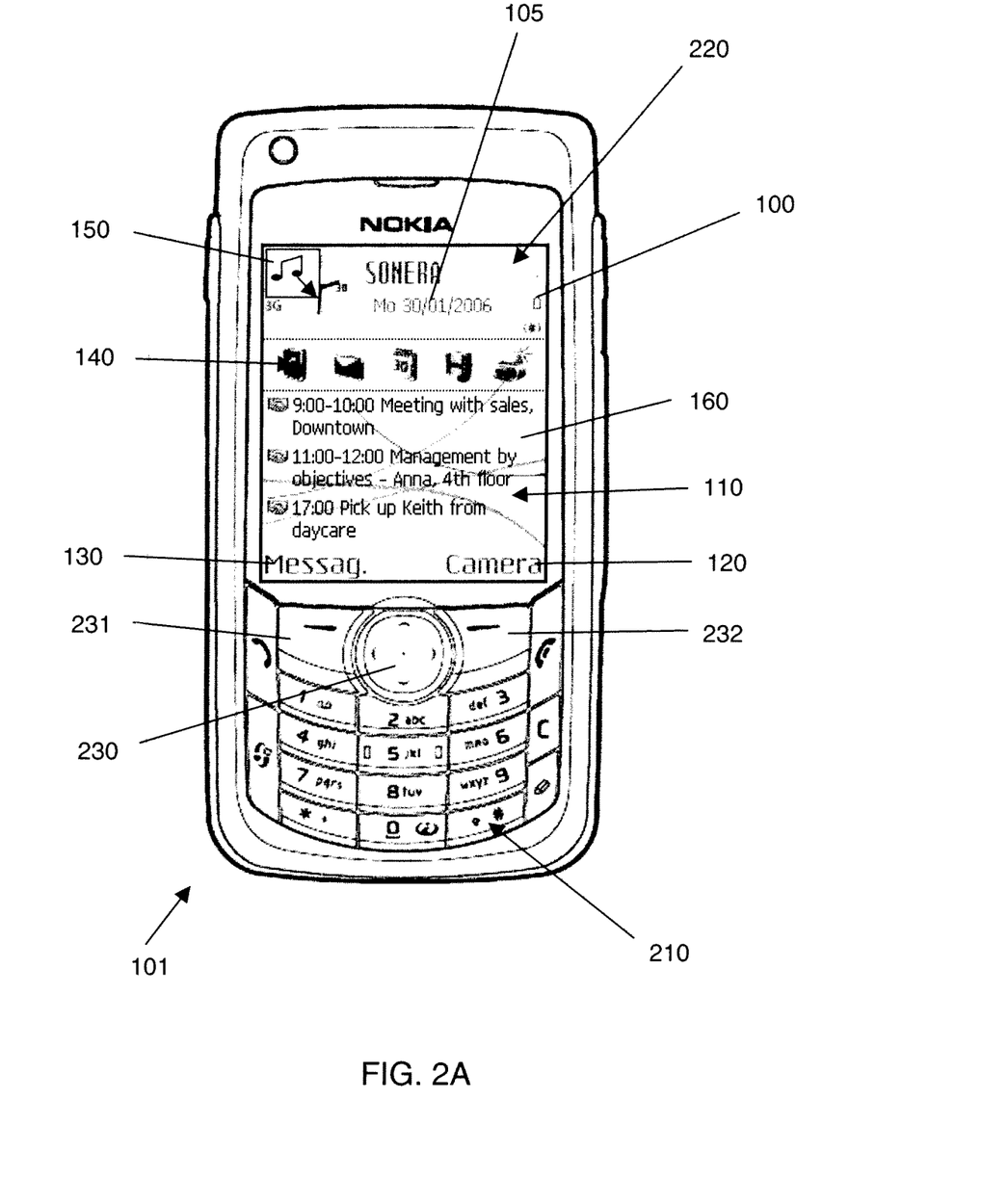
FIGS. 2A and 2B illustrate screen shots of a device in accordance with an embodiment.
Figure 2B:
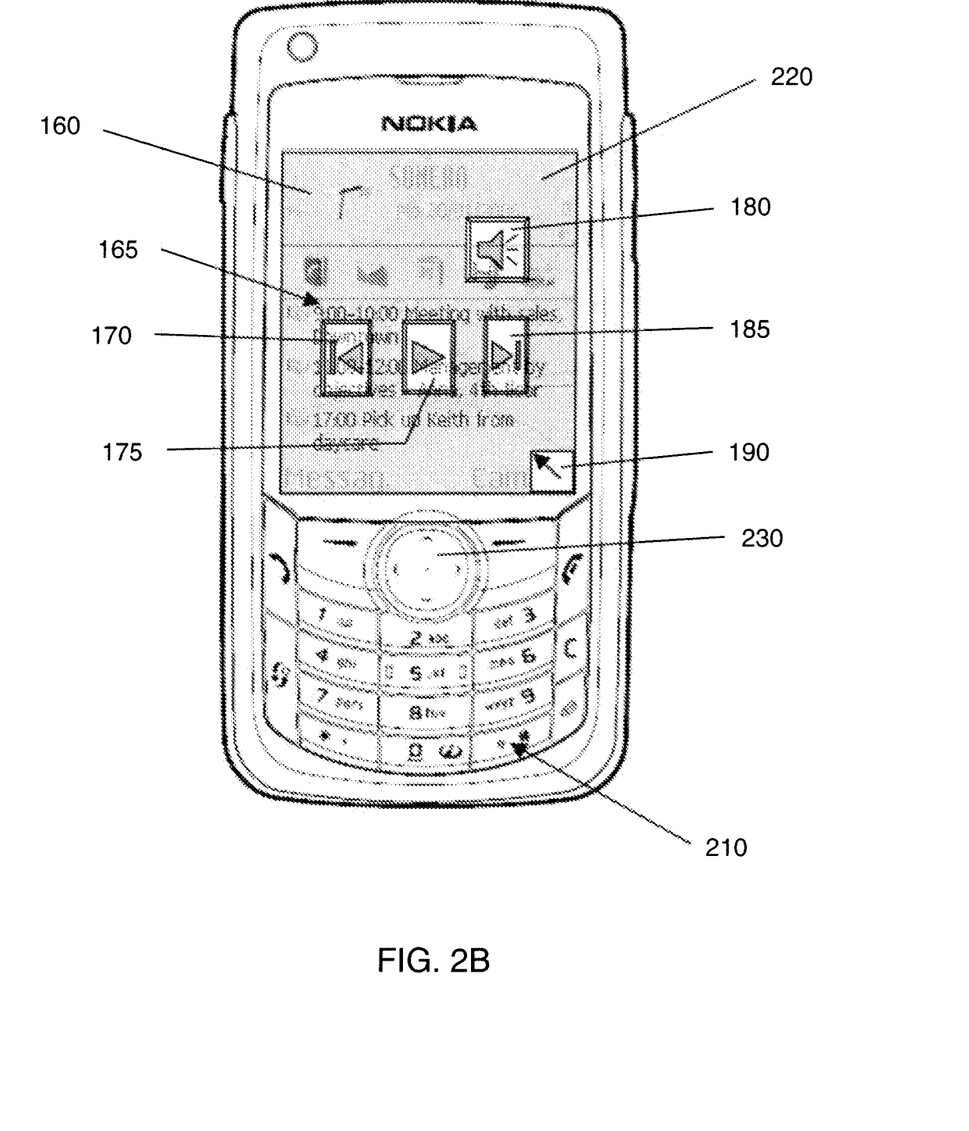

Referring now to FIGS. 2A and 2B the display 220 may also include one or more suitable indicators such as, for example, a tab or icon 150 for activating at least one transparent application of the device. In alternate embodiments any suitable indicator of the transparent application may be utilized. In this example only one tab 150 is shown but in alternate embodiments any suitable number of tabs may be presented for display on the display 220. In alternate embodiments, the keypad 210 may include keys corresponding to the transparent applications that the user may press to activate the transparent applications. In other alternate embodiments, the transparent application may be presented through the soft key functions 120, 130. In still other alternate embodiments the transparent function may be presented in any suitable manner for selection by the user such as, for example, there may be a slider along the side of the display 220 where the slider includes the transparent application tabs. The user may be able to select which applications are to be presented via transparent application tabs 150, soft key functions 130, 120 or the keys of the device 101. For example, the device may include a suitable set up menu in which the user can specify which applications are to be run in a transparent mode. In alternate embodiments, the applications that can be run in a transparent mode may be preinstalled or configured by the manufacturer of the device. In other alternate embodiments the transparent applications may be selected for presentation via the tabs 150, soft key functions 130, 120 or the keys of the device 101 in any suitable manner such as through a combination of user selectable applications and manufacturer installed applications.

The tabs 150 may be displayed in any suitable area of the display such as, for example, in a dedicated area of the display 220 or the tabs 150 may be selectively displayed on the display 220. For example, the tabs 150 may be presented in a slider as described above or they may be selectively presented in any suitable area of the display 220 when a user selects or activates a predetermined key. For example, a transparent application function may be presented through the soft key commands 120, 130 that the user may select via the soft keys 232, 231. The tabs 150 may be presented in any suitable are of the display 220 upon activation of the transparent application function. In alternate embodiments the transparent tabs 150 may be accessed via a key or combination of keys on the keypad 210. In other alternate embodiments, the tabs 150 may be accessed by the user in any suitable manner. The device may also include a key that hides or otherwise removes the tabs 150 from the display 220 such as, for example, a soft key function or a dedicated transparent application key for displaying and hiding the tabs 150. In other embodiments, the tabs 150 may be removed from the display 120 after a predetermined period of time.

In FIG. 2A, a music player tab 150 is presented on the display for selection by a user. In alternate embodiments the tab may correspond to any suitable application such as, for example, a video player, phone book, email, MMS, SMS, or any other suitable application stored in the device. As can be seen in FIG. 2B, when the music player tab 150 is selected the controls for the music player may be presented on the display 220 over the native application 160. In this example, the music player controls may include a volume icon 180, a play icon 175, a fast forward icon 185 and a rewind icon 170. In alternate embodiments the music player controls may include any suitable controls. The music player controls 170-185 may be presented on the display 220 in a transparent manner so that the user may be able to view both the native application 160 and the music player application (i.e. the transparent application 165). In addition to the music player controls, a return tab 190 may be presented on the display 220 for closing or otherwise hiding the transparent application 165. In other embodiments, the soft key functions and or a key on the keypad of the device may be configured to close or otherwise hide the transparent application. In alternate embodiments, any suitable controls or application content for any suitable application may be transparently presented over the native application. In alternate embodiments, any suitable number of transparent applications may be presented over the native application.

When the transparent application 165 is displayed on the display 220 the functionality of both the transparent application 165 and the native application 160 are active and available for selection by the user. For example, the user may be able to access and operate both the native application 160 and the transparent application 165 simultaneously. In this example, the user may operate the native application 160 through, for example, the scroll or navigation key 230 and the user may operate the transparent application 165 through, for example, a stylus 250 via the touch screen display 220. In alternate embodiments, the user may operate the native application 160 with the stylus 250 and the transparent application 165 through the scroll key 230. In other alternate embodiments the functionalities of the native and transparent application may be accessed by the user in any suitable manner. Because the user is able to view and operate the native and transparent applications 160, 165 at the same time the user does not have to switch between the two applications or continuously close one application to access the other application.

Figure 3:
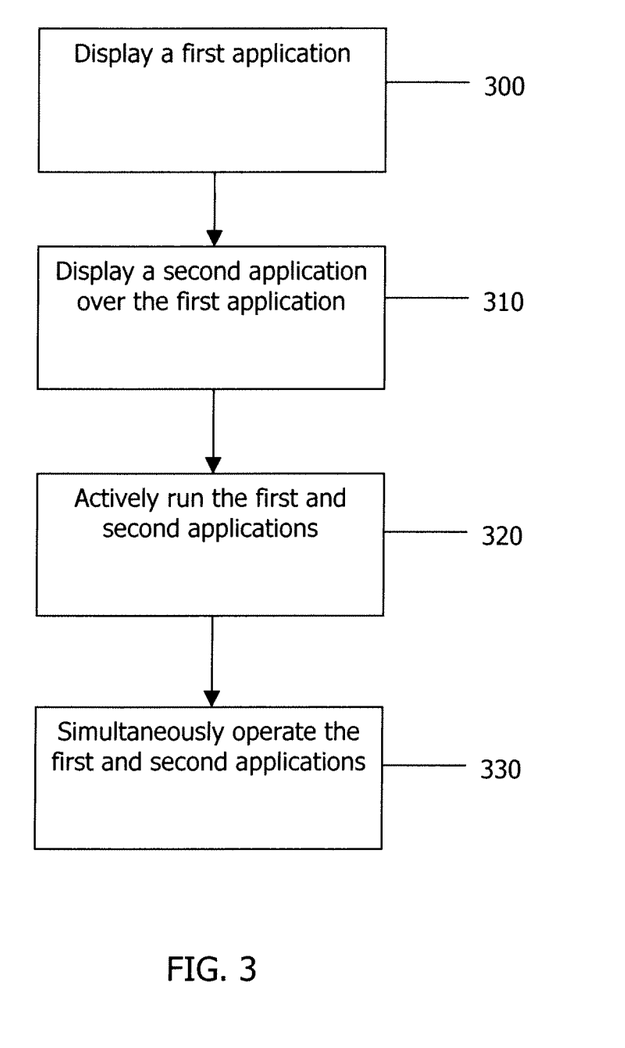
FIG. 3 shows a flow diagram in accordance with an embodiment.

Referring now to FIG. 3, an exemplary operation of the disclosed embodiments will be described. In operation, a native application 160 is displayed on the display 220 of the device 101 (FIG. 3, Block 300). The user may select a transparent application 165 in any suitable manner such as, for example, by selecting a transparent application tab or icon 150 or by pressing a key on the keypad 210. The transparent application 165 is displayed in a transparent manner over or on top of the native application 160 as can best be seen in FIG. 2B (FIG. 3, Block 310). The user may select the transparency of the transparent application (i.e. its presence over the native application) in any suitable manner such as, for example, through a menu selection of the device. In alternate embodiments, the transparency of the transparent application may be set by the manufacturer of the device. The device 101 may be configured to actively run both the native application 160 and the transparent application 165 at the same time rather than actively run a selected application while running the non-selected or inactive application in the background (FIG. 3, Block 320). By actively running both the native and transparent applications the user does not have to switch between applications (e.g. the user does not have to chose which application is inactively run in the background of the display). Because both applications are actively running in the device the user may simultaneously operate the native and transparent applications 160, 165 respectively via any suitable user interfaces (FIG. 3, Block 330). For example the user may operate the native application 165 via the keypad 210 of the device 101 while at the same time operate the transparent application 165 via a stylus 250 and the touch screen 220 of the device or vice versa. In other embodiments any suitable controls of the device 101 may be used to operate a respective one of the native and transparent applications.

Figure 4:
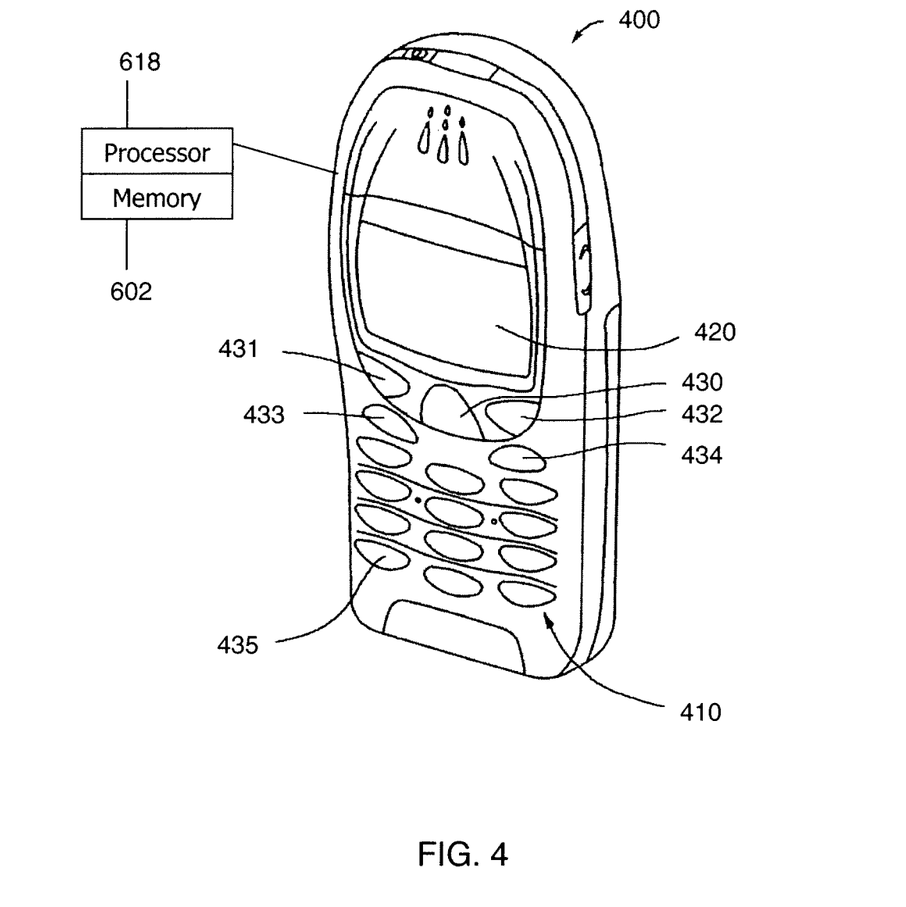
FIG. 4 illustrates a device in accordance with an embodiment.

One embodiment of a device 101 in which the disclosed embodiments may be employed is illustrated in greater detail in FIG. 4. The device may be any suitable device such as terminal or mobile communications device 400. The terminal 400 may have a keypad 410 and a display 420. The keypad 410 may include any suitable user input devices such as, for example, a multi-function/scroll key 430, soft keys 431, 432, a call key 433 and end call key 434 and alphanumeric keys 435. The display 420 may be any suitable display, such as for example, a touch screen display or graphical user interface. The display may be integral to the device 400 or the display may be a peripheral display connected to the device 400. A pointing device, such as for example, a stylus, pen or simply the user's finger may be used with the display 420. In alternate embodiments any suitable pointing device may be used. In other alternate embodiments, the display may be a conventional display. The device 400 may also include other suitable features such as, for example, a camera, loud speaker, connectivity port or tactile feedback features 623 (FIG. 6) such as vibration. The mobile communications device may have a processor 618 connected to the display for processing user inputs and displaying information on the display 420. A memory 602 may be connected to the processor 618 for storing any suitable information and/or applications associated with the mobile communications device 400 such as phone book entries, calendar entries, web browser, etc.

Figure 5:
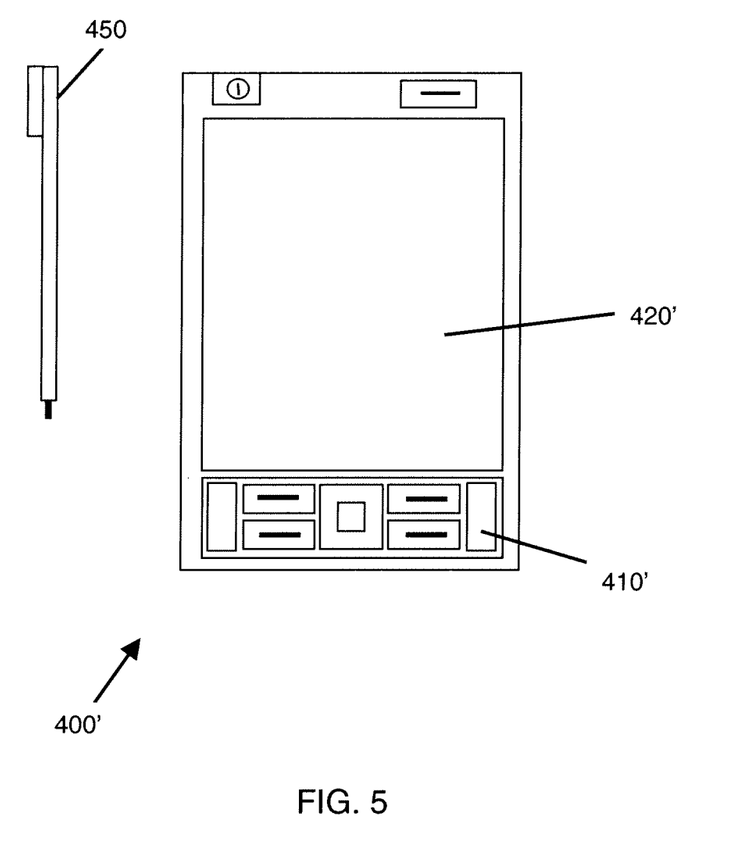
FIG. 5 illustrates a device in accordance with an embodiment.

In one embodiment, the device, may be for example, a PDA style device 400' illustrated in FIG. 5. The PDA 400' may have a keypad 410', a touch screen display 420' and a pointing device 450 for use on the touch screen display 420'. In still other alternate embodiments, the device may be a personal communicator, a tablet computer, a laptop or desktop computer, a television or television set top box or any other suitable device capable of containing the display 420 and supported electronics such as the processor 618 and memory 602.

Figure 6:
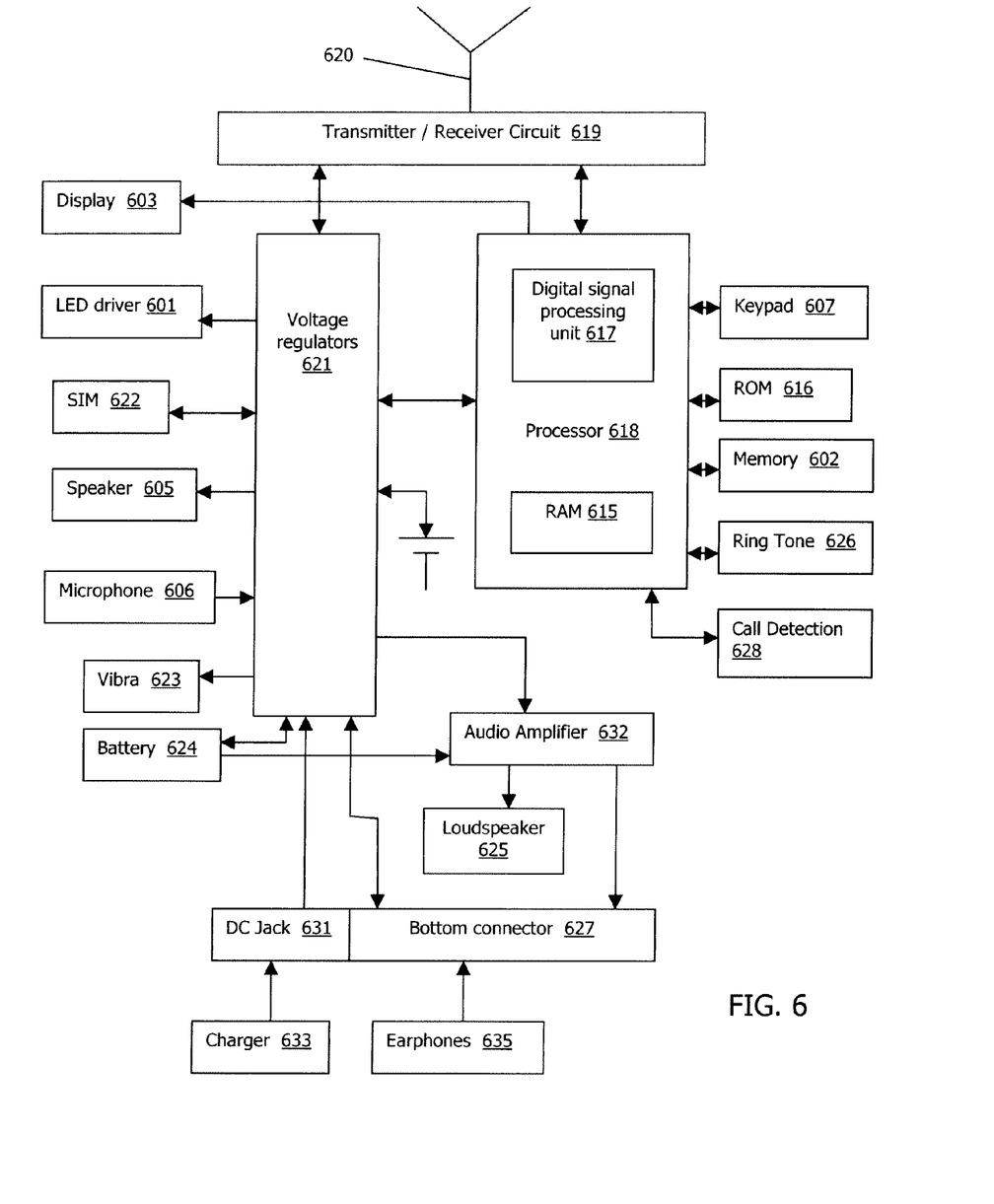
FIG. 6 is a block diagram illustrating the general architecture of the exemplary device in which aspects of the disclosed embodiments may be implemented.

FIG. 6 illustrates in block diagram form one embodiment of a general architecture of a mobile device in which aspects of the embodiments may be employed such as for example, the device 101. The mobile communications device may have a processor 618 connected to the display 603 for processing user inputs and displaying information on the display 603. The processor 618 controls the operation of the device and can have an integrated digital signal processor 617 and an integrated RAM 615. The processor 618 controls the communication with a cellular network via a transmitter/receiver circuit 619 and an antenna 620. A microphone 606 is coupled to the processor 618 via voltage regulators 621 that transform the user's speech into analog signals. The analog signals formed are A/D converted in an A/D converter (not shown) before the speech is encoded in the DSP 617 that is included in the processor 618. The encoded speech signal is transferred to the processor 618, which e.g. supports, for example, the GSM terminal software. The digital signal-processing unit 617 speech-decodes the signal, which is transferred from the processor 618 to the speaker 605 via a D/A converter (not shown).

The voltage regulators 621 form the interface for the speaker 605, the microphone 606, the LED drivers 601 (for the LEDS backlighting the keypad 607 and the display 603), the SIM card 622, battery 624, the bottom connector 627, the DC jack 631 (for connecting to the charger 633) and the audio amplifier 632 that drives the (hands-free) loudspeaker 625.

A processor 618 can also include memory 602 for storing any suitable information and/or applications associated with the mobile communications device such as phone book entries, calendar entries, etc.

The processor 618 also forms the interface for peripheral units of the device, such as for example, a (Flash) ROM memory 616, the graphical display 603, the keypad 607, a ringing tone selection unit 626, and an incoming call detection unit 628. In alternate embodiments, any suitable peripheral units for the device can be included.

The software in the RAM 615 and/or in the flash ROM 616 contains instructions for the processor 618 to perform a plurality of different applications and functions such as, for example, those described herein.

Figure 7:
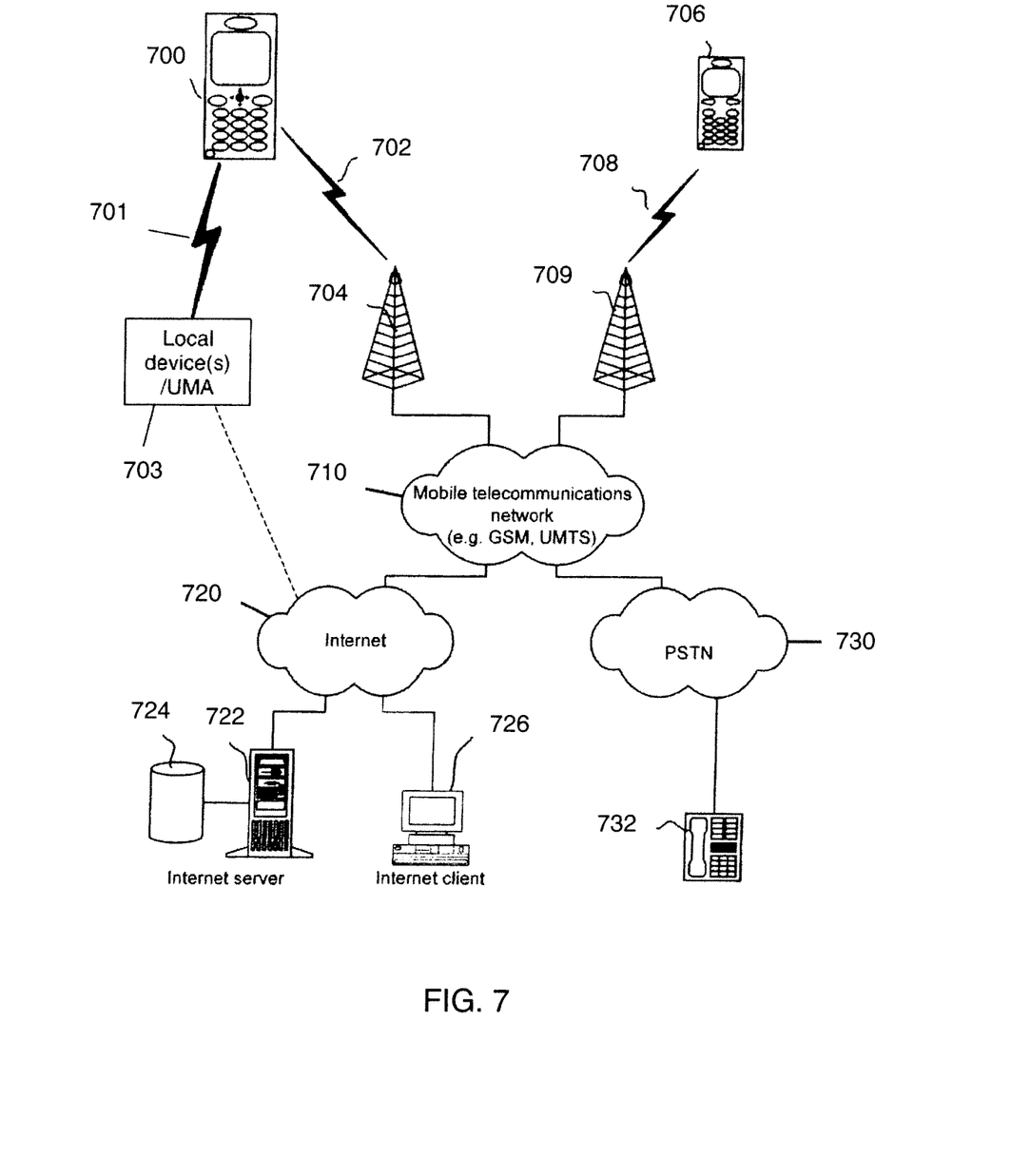
FIG. 7 is a schematic illustration of a cellular telecommunications system, as an example, of an environment in which a communications device incorporating features of an embodiment may be applied.

FIG. 7 is a schematic illustration of a cellular telecommunications system, as an example, of an environment in which a communications device 700 incorporating features of an embodiment may be applied. Communication device 700 may be substantially similar to that described above with respect to terminal 101. In the telecommunication system of FIG. 7, various telecommunications services such as cellular voice calls, www/wap browsing, cellular video calls, data calls, facsimile transmissions, music transmissions, still image transmission, video transmissions, electronic message transmissions and electronic commerce may be performed between the mobile terminal 700 and other devices, such as another mobile terminal 706, a stationary telephone 732, or an internet server 722. It is to be noted that for different embodiments of the mobile terminal 700 and in different situations, different ones of the telecommunications services referred to above may or may not be available. The aspects of the invention are not limited to any particular set of services in this respect.

The mobile terminals 700, 706 may be connected to a mobile telecommunications network 710 through radio frequency (RF) links 702, 708 via base stations 704, 709. The mobile telecommunications network 710 may be in compliance with any commercially available mobile telecommunications standard such as GSM, UMTS, D-AMPS, CDMA2000, FOMA and TD-SCDMA.

The mobile telecommunications network 710 may be operatively connected to a wide area network 720, which may be the internet or a part thereof. An internet server 722 has data storage 724 and is connected to the wide area network 720, as is an internet client computer 726. The server 722 may host a www/hap server capable of serving www/hap content to the mobile terminal 700.

For example, a public switched telephone network (PSTN) 730 may be connected to the mobile telecommunications network 710 in a familiar manner. Various telephone terminals, including the stationary telephone 732, may be connected to the PSTN 730.

The mobile terminal 700 is also capable of communicating locally via a local link 701 to one or more local devices 703. The local link 701 may be any suitable type of link with a limited range, such as for example Bluetooth, a Universal Serial Bus (USB) link, a wireless Universal Serial Bus (WUSB) link, an IEEE 802.11 wireless local area network (WLAN) link, an RS-232 serial link, etc. The local devices 703 can, for example, be various sensors that can communicate measurement values to the mobile terminal 700 over the local link 701. The above examples are not intended to be limiting, and any suitable type of link may be utilized. The local devices 703 may be antennas and supporting equipment forming a WLAN implementing Worldwide Interoperability for Microwave Access (WiMAX, IEEE 802.16), WiFi (IEEE 802.11x) or other communication protocols. The WLAN may be connected to the internet. The mobile terminal 700 may thus have multi-radio capability for connecting wirelessly using mobile communications network 710, WLAN or both. Communication with the mobile telecommunications network 710 may also be implemented using WiFi, WiMax, or any other suitable protocols, and such communication may utilize unlicensed portions of the radio spectrum (e.g. unlicensed mobile access (UMA)).

Figure 8:
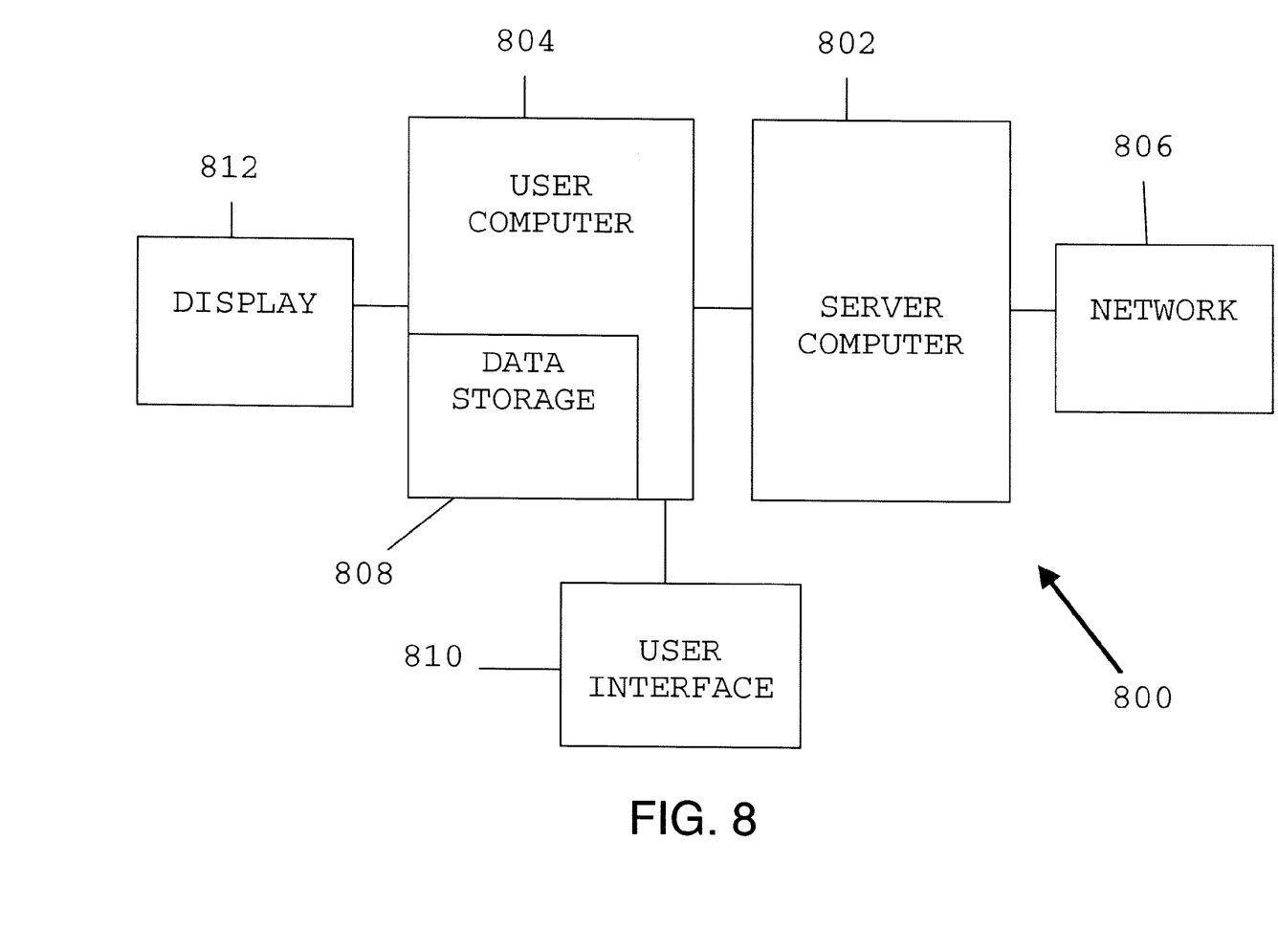
FIG. 8 illustrates a block diagram of one embodiment of a typical apparatus incorporating features that may be used to practice aspects of the invention.

The disclosed embodiments may also include software and computer programs incorporating the process steps and instructions described herein that are executed in different computers. FIG. 8 is a block diagram of one embodiment of a typical apparatus 800 incorporating features that may be used to practice aspects of the embodiments. As shown, a computer system 802 may be linked to another computer system 804, such that the computers 802 and 804 are capable of sending information to each other and receiving information from each other. In one embodiment, computer system 802 could include a server computer adapted to communicate with a network 806. Computer systems 802 and 804 can be linked together in any conventional manner including, for example, a modem, hard wire connection, or fiber optic link. Generally, information can be made available to both computer systems 802 and 804 using a communication protocol typically sent over a communication channel or through a dial-up connection on ISDN line. Computers 802 and 804 are generally adapted to utilize program storage devices embodying machine readable program source code which is adapted to cause the computers 802 and 804 to perform the method steps disclosed herein. The program storage devices incorporating aspects of the invention may be devised, made and used as a component of a machine utilizing optics, magnetic properties and/or electronics to perform the procedures and methods disclosed herein. In alternate embodiments, the program storage devices may include magnetic media such as a diskette or computer hard drive, which is readable and executable by a computer. In other alternate embodiments, the program storage devices could include optical disks, read-only-memory ("ROM") floppy disks and semiconductor materials and chips.

Computer systems 802 and 804 may also include a microprocessor for executing stored programs. Computer 802 may include a data storage device 808 on its program storage device for the storage of information and data. The computer program or software incorporating the processes and method steps incorporating aspects of the invention may be stored in one or more computers 802 and 804 on an otherwise conventional program storage device. In one embodiment, computers 802 and 804 may include a user interface 810, and a display interface 812 from which aspects of the invention can be accessed. The user interface 810 and the display interface 812 can be adapted to allow the input of queries and commands to the system, as well as present the results of the commands and queries.

The disclosed embodiments allow a user of a device to open more than one application so that the user can operate the more than one application at the same time. The device may be configured to open the transparent applications so that the transparent applications are layered over the native application and over each other in a transparent manner. All of the applications (i.e. native and transparent applications) presented on the display are active applications (e.g. the user can operate the applications without switching between them). To allow the user to operate each of the native and transparent applications, a portion of the device user interface may be configured to allow the user to operate a corresponding one of the applications.

It should be understood that the foregoing description is only illustrative of the embodiments. Various alternatives and modifications can be devised by those skilled in the art without departing from the embodiments. Accordingly, the present embodiments are intended to embrace all such alternatives, modifications and variances that fall within the scope of the appended claims.

What is claimed is:

1. An apparatus comprising:
   at least one processor; and
   at least one memory including computer program code;
   the at least one memory and the computer program code configured to, with the at least one processor, cause the apparatus to at least:
   cause display of first content associated with a first application, the first content including at least a first user-selectable control; and
   cause display of second content associated with a second application, wherein the second content is displayed transparently over the first content and the second content including at least a second user-selectable control;
   wherein each of the at least first and second user-selectable controls is associated with a functionality of its respective first and second application, and
   wherein the first user-selectable control of the first content remains user-selectable when the second content is displayed transparently over the first content.

2. The apparatus of claim 1, wherein the at least one memory and the computer program code is further configured to, with the at least one processor, cause the apparatus to at least:
   cause display of one or more indicators associated with one or more applications, each indicator corresponding to an application, including the second application, to be run in a transparent mode;
receive selection of the one of the indicators; and
in response to receiving the selection of the one or more indicators, execute one or more applications corresponding to the selected one or more indicators, including the second application, wherein content associated with the one or more applications are transparently presented over the first application.

3. The apparatus of claim 2, wherein the one or more indicators are presented in a menu.

4. The apparatus of claim 1, wherein the first and second applications are active applications that are configured to operate simultaneously and operate independent of each other.

5. The apparatus of claim 1, wherein the at least the second user-selectable control is transparently presented, and wherein the at least one memory and the computer program code is further configured to, with the at least one processor, cause the apparatus to at least:
cause the at least the second user-selectable control to be selectable when the at least the first user-selectable control is selectable.

6. The apparatus of claim 1, wherein the at least the first user-selectable control that remains user-selectable is presented at least partially under the at least the second user-selectable control.

7. The apparatus of claim 1, wherein the at least the first user-selectable control and the at least the second user-selectable control are simultaneously user-selectable.

8. The apparatus of claim 1, wherein the at least one memory and the computer program code are further configured to, with the at least one processor, cause the apparatus to receive a first user input from the at least the first user-selectable control and receive a second user input from the at least the second user-selectable control.

9. The apparatus of claim 8, wherein the at least one memory and the computer program code are further configured to, with the at least one processor, cause the apparatus to operate the first application with the first user input and operate the second application with the second user input.

10. The apparatus of claim 8, wherein the at least one memory and the computer program code are further configured to, with the at least one processor, cause the apparatus to receive one of the first or second user inputs via a keypad of the apparatus, and receive the other user input via a touch screen display of the apparatus.

11. The apparatus of claim 1, wherein the at least one memory and the computer program code are further configured to, with the at least one processor, cause the apparatus to assign a different portion of a user interface for each application, including the first and second applications.

12. The apparatus of claim 1, wherein the at least the first user-selectable control and the at least the second user-selectable control comprise at least one icon.

13. The apparatus of claim 1, wherein the apparatus comprises one of:
a mobile communications device;
a television;
a television set-top box;
a PDA-style device;
a personal communicator;
a tablet computer; or
a laptop or desktop computer.

14. The apparatus of claim 1, wherein the at least one memory and the computer program code are further configured to, with the at least one processor, cause the apparatus to present at least one indicator for closing or hiding the second application.

15. A method comprising:
causing display of a first content associated with a first application, the first content including at least a first user-selectable control; and
causing display of a second content associated with a second application, wherein the second content is displayed transparently over the first content and the second content including at least a second user-selectable control;
wherein each of the at least first and second user-selectable controls is associated with a functionality of its respective first and second application, and
wherein the first user-selectable control of the first content remains user-selectable when the second content is displayed transparently over the first content.

16. The method of claim 15, further comprising:
causing display of one or more indicators associated with one or more applications, each indicator corresponding to an application, including the second application, to be run in a transparent mode;
receiving selection of the one of the indicators; and
in response to receiving the selection of the one or more indicators, executing one or more applications corresponding to the selected one or more indicators, including the second application, wherein content associated with the one or more applications are transparently displayed over the first application.

17. The method of claim 15, wherein the method is implemented by one of:
a mobile communications device;
a television;
a television set-top box;
a PDA-style device;
a personal communicator;
a tablet computer; or
a laptop or desktop computer.

18. A computer program product comprising at least one non-transitory computer-readable storage medium having computer-executable program code instructions stored therein, the computer-executable program code instructions comprising program code instructions to:
cause display of first content associated with a first application, the first content including at least a first user-selectable control; and
cause display of second content associated with a second application, wherein the second content is displayed transparently over the first content and the second content including at least a second user-selectable control;
wherein each of the at least first and second user-selectable controls is associated with a functionality of its respective first and second application, and
wherein the first user-selectable control of the first content remains user-selectable when the second content is displayed transparently over the first content.

19. The computer program product of claim 18, wherein the computer-executable program code instructions further comprise program code instructions to:
cause display of one or more indicators associated with one or more applications, each indicator corresponding to an application, including the second application, to be run in a transparent mode;
receive selection of the one of the indicators; and in response to receiving the selection of the one or more indicators, execute one or more applications corresponding to the selected one or more indicators, including the second application, wherein content associated with the one or more applications are transparently displayed over the first application.

20. The computer program product of claim 18, perform on any one of:
   a mobile communications device;
   a television;
   a television set-top box;
   a PDA-style device;
   a personal communicator;
   a tablet computer; or
   a laptop or desktop computer.

* * * * *